(12) United States Patent
Hassan

(10) Patent No.: US 7,555,560 B2
(45) Date of Patent: Jun. 30, 2009

(54) IP RATE CONTROL

(75) Inventor: Mahbub Hassan, Botany (AU)

(73) Assignee: Canon Kabushiki Kaisha, Tokyo (JP)

( * ) Notice: Subject to any disclaimer, the term of this patent is extended or adjusted under 35 U.S.C. 154(b) by 1106 days.

(21) Appl. No.: 10/737,968

(22) Filed: Dec. 18, 2003

(65) Prior Publication Data

US 2005/0278456 A1 Dec. 15, 2005

(30) Foreign Application Priority Data

Dec. 19, 2002 (AU) .............................. 2002953479

(51) Int. Cl.
*G06F 15/16* (2006.01)
*G06F 15/173* (2006.01)
*G06F 15/177* (2006.01)

(52) U.S. Cl. ........................ 709/235; 370/230; 370/235

(58) Field of Classification Search ......... 709/233–238, 709/217–224
See application file for complete search history.

(56) References Cited

U.S. PATENT DOCUMENTS

| | | | |
|---|---|---|---|
| 6,341,309 B1 * | 1/2002 | Vaid et al. .................. | 709/223 |
| 6,473,793 B1 | 10/2002 | Dillon | |
| 7,039,013 B2 * | 5/2006 | Ruutu et al. ................. | 370/235 |
| 2001/0017844 A1 | 8/2001 | Mangin ....................... | 370/231 |
| 2002/0031088 A1 | 3/2002 | Packer ......................... | 370/231 |
| 2003/0063564 A1 * | 4/2003 | Ha et al. ...................... | 370/230 |
| 2004/0170176 A1 * | 9/2004 | Kadambi et al. ............ | 370/392 |

OTHER PUBLICATIONS

M. Hassan, et al., "HG-RCP: A rate-based flow control mechanism for intranets interconnected by ATM networks", Computer Networks, vol. 31, No. 22, pp. 2361-2379, Dec. 1999.

* cited by examiner

*Primary Examiner*—Haresh N Patel
(74) *Attorney, Agent, or Firm*—Fitzpatrick, Cella, Harper & Scinto

(57) ABSTRACT

A system for controlling congestion is disclosed, the system comprising a host computer (108C) adapted to run concurrent processes (402, 412) and a gateway (100C) through which communications traffic from the concurrent processes (402, 412) to corresponding concurrent processes is directed. The gateway comprises means (906) for determining available bandwidth on connections (106) between the gateway and the corresponding concurrent processes, means (910) for determining host rate control information dependent upon said available bandwidth, and means (906) for communicating the host rate control information to the host computer (108C). The host computer (108C) comprises means (406, 416) for independently controlling traffic from each said concurrent process (402, 412) to the corresponding concurrent process according to the host rate control information.

2 Claims, 11 Drawing Sheets

IP RATE CONTROL

FIELD OF THE INVENTION

The present invention relates generally to congestion control in communications networks and, in particular, to congestion control in networks using the Internet Protocol (IP).

BACKGROUND

It is to be noted that the discussions contained in the "Background" section and in the present section relating to prior art arrangements relate to devices, processes or published documents. Such should not be interpreted as a representation by the present inventor(s) or patent applicant that such devices, processes or published documents in any way form part of the common general knowledge in the art.

Corporations typically build Virtual Private Networks (VPNs) by interconnecting Local Area Networks (LANs) in geographically distributed sites via physical or virtual leased lines. The bandwidth of these long-distance leased lines is, however, typically orders of magnitude lower than the bandwidths available in the LANs. Consequently, gateways interconnecting these high-speed LANs to the much slower long-distance leased lines can be the source of congestion, causing large packet queues, delay, jitter and packet loss.

In IP networks, hosts in one geographic site transmit IP packets to another (distant) site over the leased lines through the gateways. These IP packets may carry voice, video and other data. If there is congestion in a gateway, the packets transiting the gateway can be delayed or even lost due to buffer overflow in the gateway. Delay, variability of delay (commonly referred to as jitter) and packet loss can drastically reduce the performance of multimedia applications which are running between two host machines located in different sites.

To control congestion in IP networks, a transport layer protocol, called the Transmission Control Protocol (TCP), is used to pace the flow of data from source to destination. However, TCP operates on a time scale of Round-Trip Times (RTTs) which can be very large, when compared to the bit period of the traffic being considered, for long distance communications networks. With the emergence of high-speed multimedia applications running across multiple geographically separated sites, congestion at site gateways can build up in a much shorter time scale than the TCP control mechanisms can respond, thereby rendering TCP's congestion control unsatisfactory in many situations.

U.S. patent application Ser. No. 09/944,746, now U.S. Pat. No. 6,741,563 describes a method of adjusting the TCP window size at the gateway in order to control the data flow of a given TCP connection. Since TCP window size information is encapsulated in the Internet Protocol (IP) payload, this approach requires the gateway to have access to the IP payload. It is difficult to provide access to the IP payload at intermediate nodes such as gateways, and it may even not be possible, for example in secure communication environments where IP payloads may be encrypted using the IP Security Protocol IPSEC. A similar method, which also adjusts the TCP window size at the gateway is described in U.S. patent application Ser. No. 09/770,215, now U.S. Pat. No. 6,925,060. The approach described here is not suitable for environments where the IP payloads are encrypted, since it relies on adjustment of the TCP window size at the gateway.

A third method, proposed in "HGRCP: A rate-based flow control mechanism for Intranets interconnected by ATM networks" by Hassan et al., Computer Networks, Volume 31, No. 22, pages 2361-2379, December 1999 uses a rate signalling-protocol between the gateway and the hosts to control an aggregate rate of each host. This method does not, however, prevent individual applications in a given host competing in an unfair manner with each other for bandwidth resources between sites.

SUMMARY

It is an object of the present invention to substantially overcome, or at least ameliorate, one or more disadvantages of existing arrangements.

This specification discloses a technique for controlling congestion at a site gateway by firstly using explicit rate signalling from the gateway to its associated hosts. The technique also involves traffic shaping on a per-process basis within each host, where the term "process" typically relates to a software based application running on the host. This approach provides congestion control on a per-process basis, thereby enabling each process on a host to access available bandwidth resources in the inter-site network in a fair manner having regard to other processes running on the same host.

According to a first aspect of the present disclosure, there is provided a system for controlling congestion, the system comprising:

a host computer adapted to run concurrent processes; and a gateway through which communications traffic from the concurrent processes flows to corresponding processes; wherein the gateway is adapted to determine available bandwidth on the connection between the gateway and the corresponding processes, and to communicate host rate control information which is dependent upon said available bandwidth to the host computer; and the host computer is adapted to control a traffic flow between each said concurrent process and the associated said corresponding process according to the host rate control information.

According to another aspect of the present disclosure, there is provided a method for controlling congestion of traffic flows from processes running concurrently on a host computer, via a gateway, to corresponding processes, the method comprising the steps of:

determining available bandwidth on a connection between the gateway and the corresponding processes;

defining host rate information as a function of the available bandwidth; and controlling a traffic flow between each said concurrent process and the gateway in accordance with the host rate information.

According to another aspect of the present disclosure, there is provided congestion control system comprising;

a host computer adapted to concurrently run a plurality of processes communicating with corresponding processes; and the gateway to which the host computer is connected; wherein the gateway comprises:

means for determining available bandwidth on connections between the gateway and the corresponding processes; and means for advising the host computer of the available bandwidth; and wherein:

the host computer comprises:

means for controlling the rate of a traffic flow between each of the concurrent processes and the respective corresponding processes according to the available bandwidth.

According to another aspect of the present disclosure, there is provided a host computer adapted to concurrently run a plurality of processes, said host computer comprising:

means for interposing a corresponding traffic shaper between each of the concurrent processes and a gateway to which the host computer is connected, wherein said each concurrent process communicates with a respective corresponding process; and means for controlling each said traffic shaper according to available bandwidth on the connection between the gateway and the corresponding processes, wherein the available bandwidth is communicated to the host computer by the gateway;

wherein said traffic shapers are adapted to control the rate at which each said concurrent process communicates with each said corresponding process.

According to another aspect of the present disclosure, there is provided a method for communicating by a plurality of processes via a gateway, the method comprising the steps of:

receiving, from the gateway, information dependent on available bandwidth that is allocated to the gateway; and controlling, based on the received information, each traffic flow of the plurality of processes.

According to another aspect of the present disclosure, there is provided a method for controlling a gateway, the method comprising the steps of:

sending data from a plurality of processes received from a first network through the gateway to a second network;

identifying a bandwidth available for sending the data of the plurality of processes in the sending step; and sending information based on the identified bandwidth information to at least one of an apparatus and apparatuses that are performing the plurality of processes, for the at least one of the apparatus and the apparatuses to control the traffic flow from each of the plurality of processes.

According to another aspect of the present disclosure, there is provided program for controlling traffic flow of a plurality of processes, the program comprising code for performing the steps of:

determining each traffic flow of the plurality of processes based on information received from a gateway; and controlling the traffic flow of each process based on the determination of the determining step, wherein the information received from the gateway is based on a bandwidth available for the gateway.

According to another aspect of the present disclosure, there is provided program for controlling a gateway comprising code for performing the steps of:

identifying a bandwidth available when sending data of plural processes received from a first network through the gateway to a second network; and sending information based on the identified bandwidth information to at least one of an apparatus and apparatuses that are performing the plurality of processes, for the at least one of the apparatus and the apparatuses to control the traffic flow from each of the plurality of processes.

According to another aspect of the present disclosure, there is provided a host computer adapted for controlling congestion between concurrent processes running on the host and communicating with corresponding concurrent processes through a gateway, the host computer comprising:

means for receiving host rate control information from the gateway; and means for controlling traffic from each said concurrent process to the corresponding concurrent process according to the host rate control information;

wherein the gateway determines available bandwidth on connections between the gateway and the corresponding concurrent processes, determines the host rate control information dependent upon said available bandwidth, and communicates the host rate control information to the host computer.

According to another aspect of the present disclosure, there is provided gateway adapted for controlling congestion between concurrent processes running on a host computer and communicating with corresponding concurrent processes through the gateway, the gateway comprising:

means for determining available bandwidth on connections between the gateway and the corresponding concurrent processes;

means for determining host rate control information dependent upon said available bandwidth; and means for communicating the host rate control information to the host computer; wherein the host computer controls traffic from each said concurrent process to the corresponding concurrent process according to the host rate control information.

According to another aspect of the present disclosure, there is provided a host computer method for controlling congestion between concurrent processes running on the host and communicating with corresponding concurrent processes through a gateway, the method comprising the steps of:

controlling traffic from each said concurrent process to the corresponding concurrent process according to host rate control information; wherein the gateway determines available bandwidth on connections between the gateway and the corresponding concurrent processes, determines the host rate control information dependent upon said available bandwidth, and communicates the host rate control information to the host computer.

Other aspects of the invention are also disclosed.

BRIEF DESCRIPTION OF THE DRAWINGS

Some aspects of the prior art and one or more embodiments of the present invention are described in this specification with reference to the drawings, in which.

DETAILED DESCRIPTION INCLUDING BEST MODE

Figure 1:
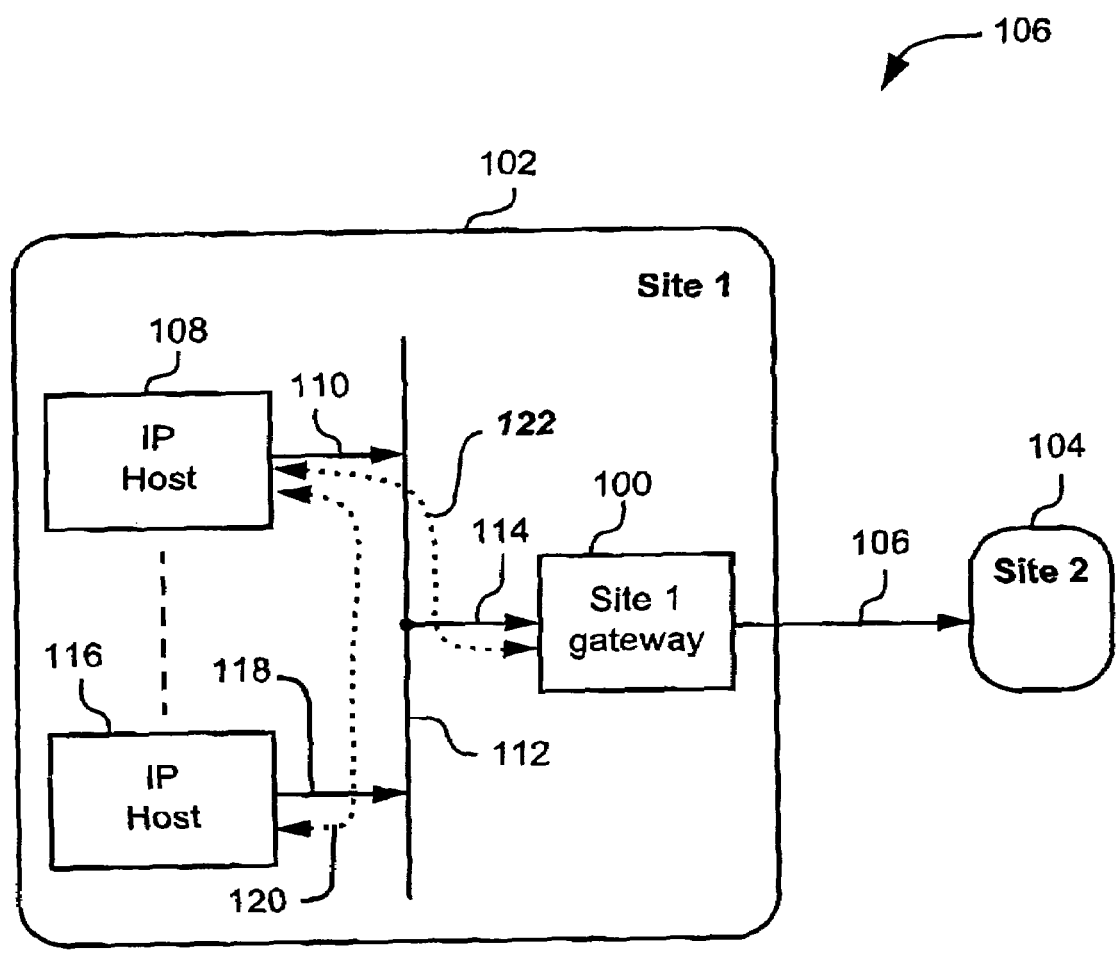
FIG. 1 shows a functional block diagram of a multi-site network in which the disclosed congestion control technique can be practiced.

This detailed description has the following structure. Firstly the overall system being considered is described. Then some terminology definitions are provided. Thereafter, two prior art host/gateway congestion control functional arrangements are described. The host/gateway arrangement functional arrangement for the disclosed congestion control technique is then described. Thereafter, the distribution of functional blocks and a number of process flow descriptions are presented. Finally, one example of a physical implementation of the system is set out.

Where reference is made in any one or more of the accompanying drawings to steps and/or features, which have the same reference numerals, those steps and/or features have for the purposes of this description the same function(s) or operation(s), unless the contrary intention appears.

FIG. 1 shows a system functional block diagram of a multi-site network in which the described congestion control technique can be practiced. A first site 102 contains a number of host machines 108 . . . 116 connected by respective links 110 . . . 118 to a Local Area Network (LAN) 112. The site 102 also has a gateway 100 connected to the LAN 112 by a link 114.

In typical corporate networks, the LAN 112 is a high speed network, generally running at bit rates ranging from 10 Mbytes per second to over 100 Mbytes per second. Intra-site traffic, which is depicted by a dashed arrow 120 running between the host machines 108 and 116, encounters little traffic congestion since it is carried on the high speed LAN infrastructure. Inter-site traffic, however, which is depicted by a dashed arrow 122, is routed through the gateway 100 and over a relatively low speed link 106 to a second site 104. In practical corporate networks, the link 106 is implemented using a bandwidth which is determined by considering both the traffic bandwidth requirements and the financial cost of bandwidth. Typical bandwidths used for the link 106 range from a single voice circuit at 64 KB per second to higher leased-line rates of 1.5 Mbytes per second. The bandwidth mismatch between the high speed LAN infrastructure and the inter-site link 106 causes congestion problems in the gateway 100.

It is assumed in the rest of the present description that intra-site traffic depicted by the dashed arrow 120 is not routed through the gateway 100, and the specification is only concerned with inter-site traffic as depicted by the dashed arrow 122. Accordingly, the intra-site traffic is ignored in the remainder of the specification and drawings for the sake of clarity.

Figure 2:
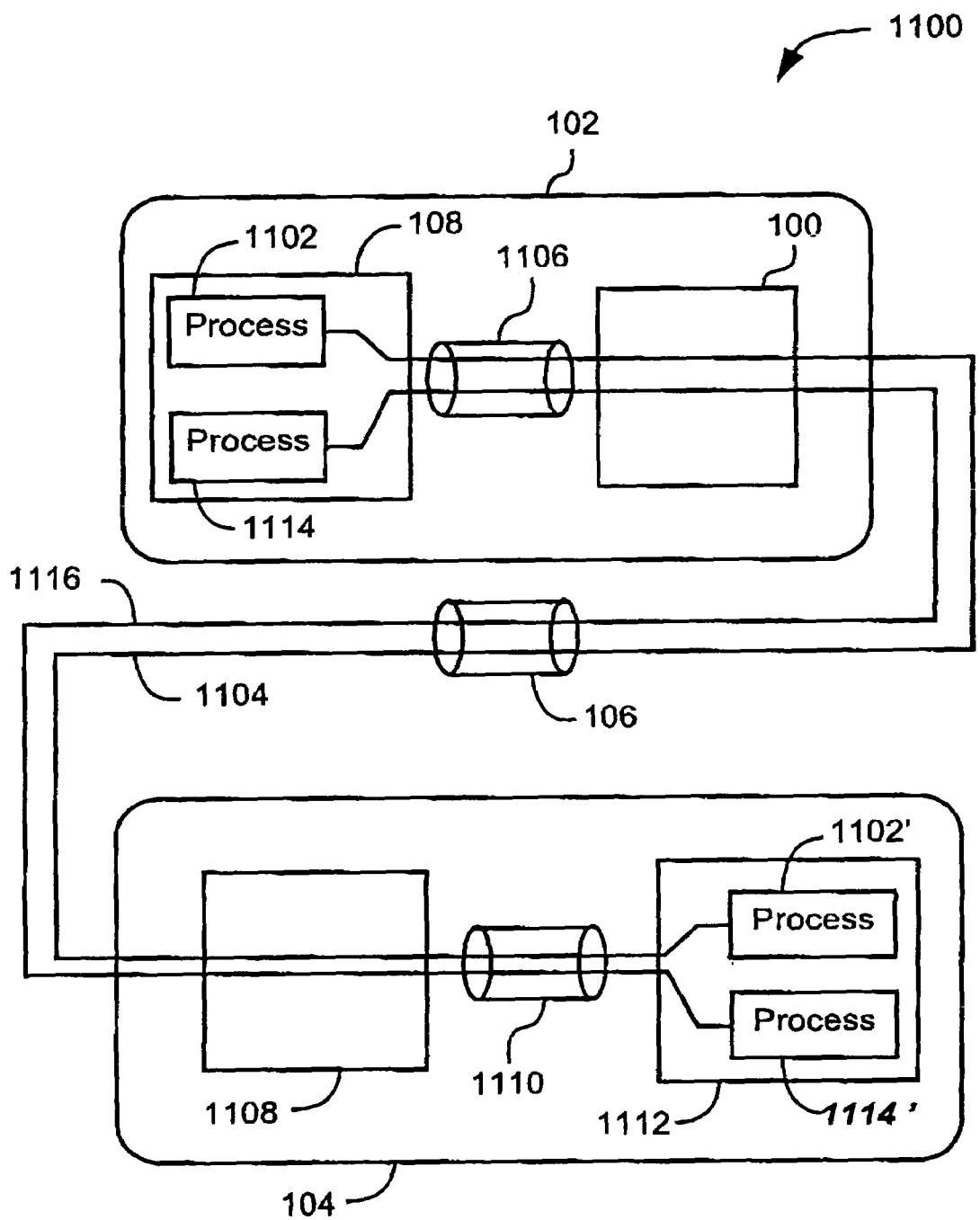
FIG. 2 shows a functional block diagram of a multi-site network showing link and connection details.

FIG. 2 shows another view 1100 of the sites 102 and 104. FIG. 2 is used to define a number of terms used throughout the specification, in particular the terms "link", and "connection". Two software processes 1102 and 1114, also referred to as software applications, are shown running concurrently on the host machine 108. The process 1102 communicates over a connection 1104 with a corresponding process 1102' on a host machine 1112 in the site 104. The process 1114 on the host machine 1108 communicates over a connection 1116 with a corresponding process 1114' running on the host machine 1112. The connections 1104 and 1116 are carried over a physical link 1106 from the host machine 108 to the gateway 100. The connections 1104 and 1116 are then carried between the sites 102 and 104 over the link 106. The site 104 has a gateway 1108 which is connected to the host machine 1112 by means of a link 1110. In the remainder of this description the term "link" will be used to denote a physical data path, such as a copper wire, an optical fibre, or a wireless transmission path. The term "connection", on the other hand, will be used to denote a virtual data connection carried over a physical link.

Figure 3:
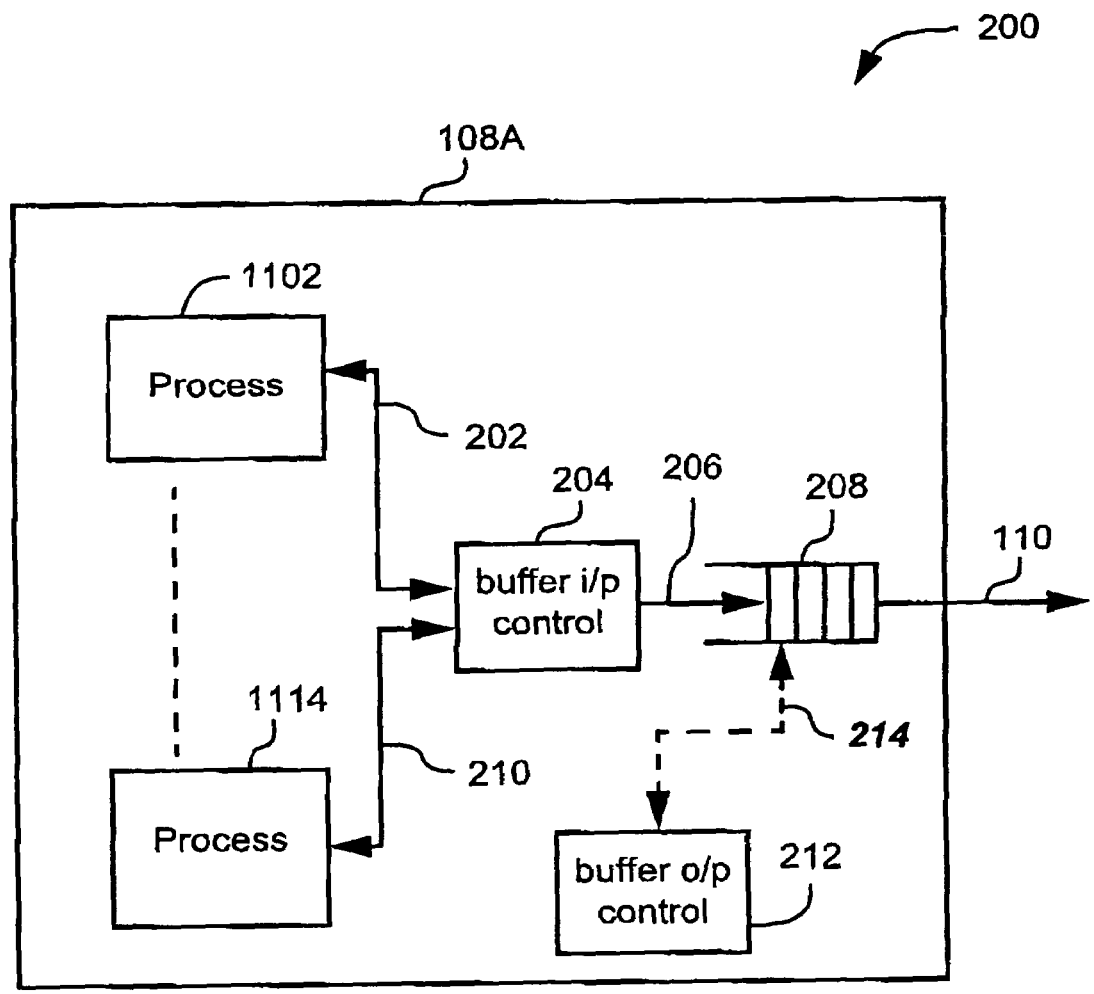
FIG. 3 shows a functional block diagram of a first type of prior art host.

FIG. 3 shows a first prior art arrangement 200 of the host machine 108 from FIG. 1. The host machine in FIG. 3 is referred to by the reference numeral 108A. The process 1102 which is running on the host machine 108A generates IP packets and distributes them as depicted by an arrow 202 to a buffer input control module 204. The process 1114 similarly generates data packets and distributes them as depicted by an arrow 210 to the buffer input control module 204. The buffer input control module 204 delivers the aforementioned packets from the processes 1102 and 1114 to a buffer 208 as depicted by an arrow 206, if there is enough space in the buffer 208 to hold these packets. If the buffer 208 is full, then the buffer control module 204 forces the processes 1102 and 1114 to block generation of IP packets, until space is again available in the buffer 208.

It is noted that the buffer input control module 204 does not pay any regard to the attributes of the processes 1102 and 1114 and does not attempt to impose any conditions of fairness when delivering data packets from the processes 1102, 1114 to the buffer 208. A buffer output control module 212 monitors the state of the buffer 208, and each time a data packet in the buffer 208 is transmitted onto the link 110, the control module 212 readies the next packet in the buffer 208 for transmission.

In the event that traffic congestion occurs on the link 110 or further downstream from the host machine 108A, then the buffer 208 will become full, in which case the processes 1102 and 1114 will be blocked. In this arrangement the processes 1102 and 1114 may share the bandwidth available on the link 110 in an unfair manner.

Figure 4:
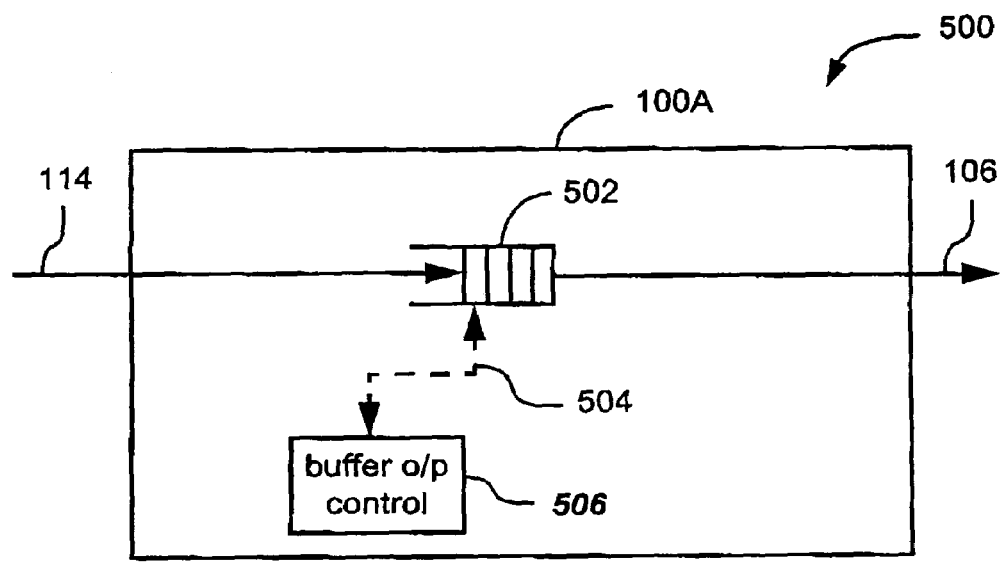
FIG. 4 shows a functional block diagram of a prior art gateway, suitable for operation with the host of FIG. 3.

FIG. 4 shows a functional block diagram 500 of a prior art gateway 100A which is adapted to inter-work with the host machine 108A of FIG. 3. The gateway 100A receives data packets on the link 114 from the host machines 108 . . . 116 in the site 102 via the LAN 112. The present description presumes that the site 102 has a single gateway 100 serving the plurality of host machines 108, . . . , 116, however the disclosed congestion technique can also be used if the site 102 has more than one gateway. The data traffic on the link 114 is delivered to a common First In First Out (FIFO) buffer 502. A buffer output control module 506 determines when a data packet in the buffer 502 is delivered to the output link 106, after which the buffer output control module 506 prepares the next data packet in the buffer 502 for transmission.

If there is traffic congestion on the link 106 or further downstream, then the buffer 502 can overflow, resulting in loss of data packets. Depending on the sensitivity of the processes 1102 and 1114 and their corresponding "far end" processes 1102' and 1114' (see FIG. 2) to data flow impairment, the aforementioned loss of data packets can cause effects ranging from reduced quality through to complete failure of the processes 1102/1102' and/or 1114/1114'.

Figure 5:
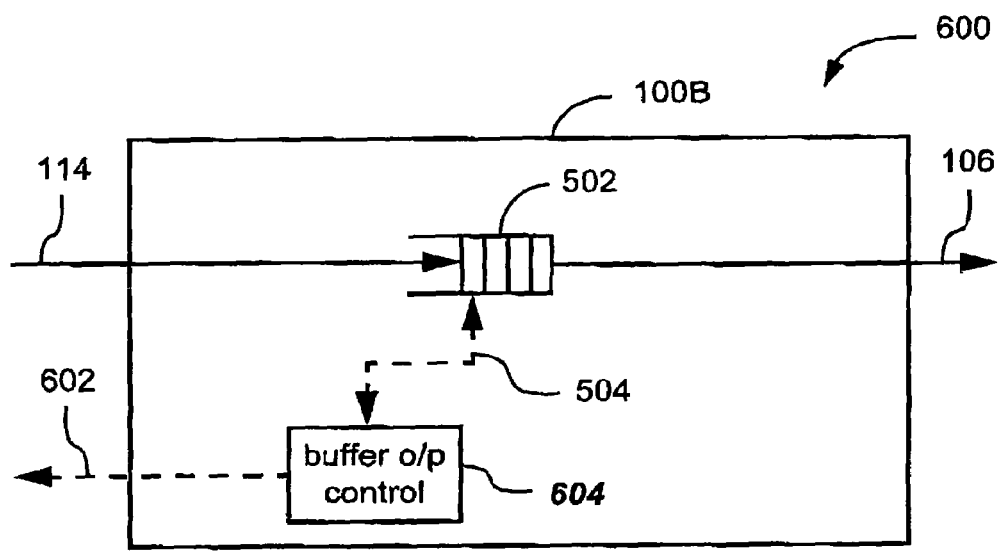
FIG. 5 shows a functional block diagram of another type of prior art gateway.

FIG. 5 shows a functional block diagram of another prior art gateway 100B. In this gateway 100B the buffer output control module 604 is capable of providing an explicit rate-feedback signal 602 based upon the state of the buffer 502. This signal 602 is used in the corresponding host machine which is described in relation to FIG. 6.

Figure 6:
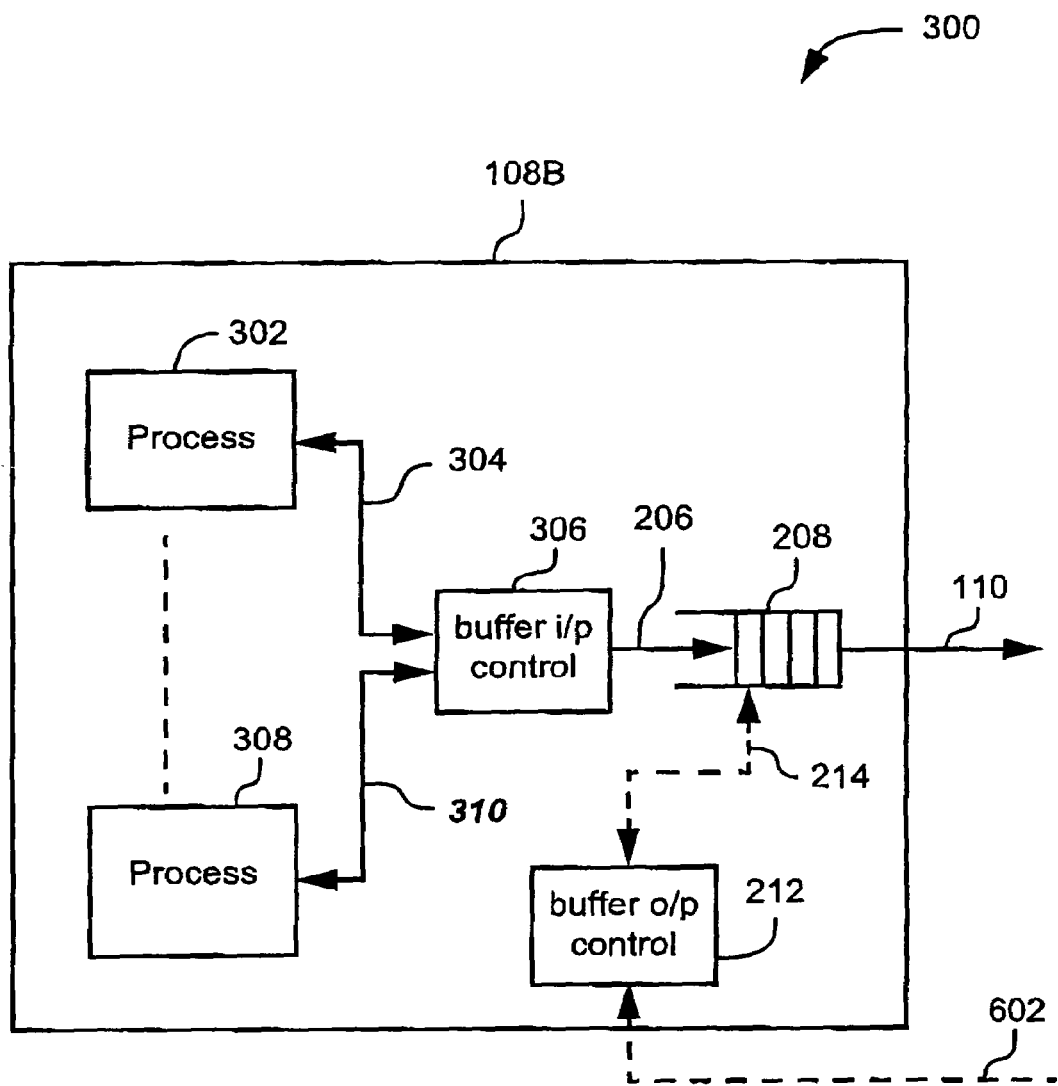
FIG. 6 shows a functional block diagram of a prior art host that is adapted for operation with the gateway of FIG. 5.

FIG. 6 shows a functional block diagram of a prior art host machine 108B that is adapted to work with the gateway 100B of FIG. 5. The explicit rate feedback signal 602 from the gateway 100B is fed back to a buffer output control module 212 in the host machine 108B.

When the gateway 100B of FIG. 5 decides that the buffer 502 is beginning to approach a congested state, then the rate feedback signal 602 tells the buffer output control module 212 in the host machine 108B to control the output rate of the host machine 108B.

Although the prior art arrangement of FIG. 5/FIG. 6 can prevent buffer overflow in the gateway buffer 502, the rate control feedback signal 602 throttles back all the processes 302 . . . 308 in the host machine without any regard to the attributes, requirements or performance of the various processes. Accordingly, for example, a data file transfer process and a video conferencing process would both be throttled back without regard for the respective requirements of the processes. Clearly a data file transfer process is typically insensitive to packet delay, while a video conferencing process would generally be extremely sensitive to packet delay.

Figure 7:
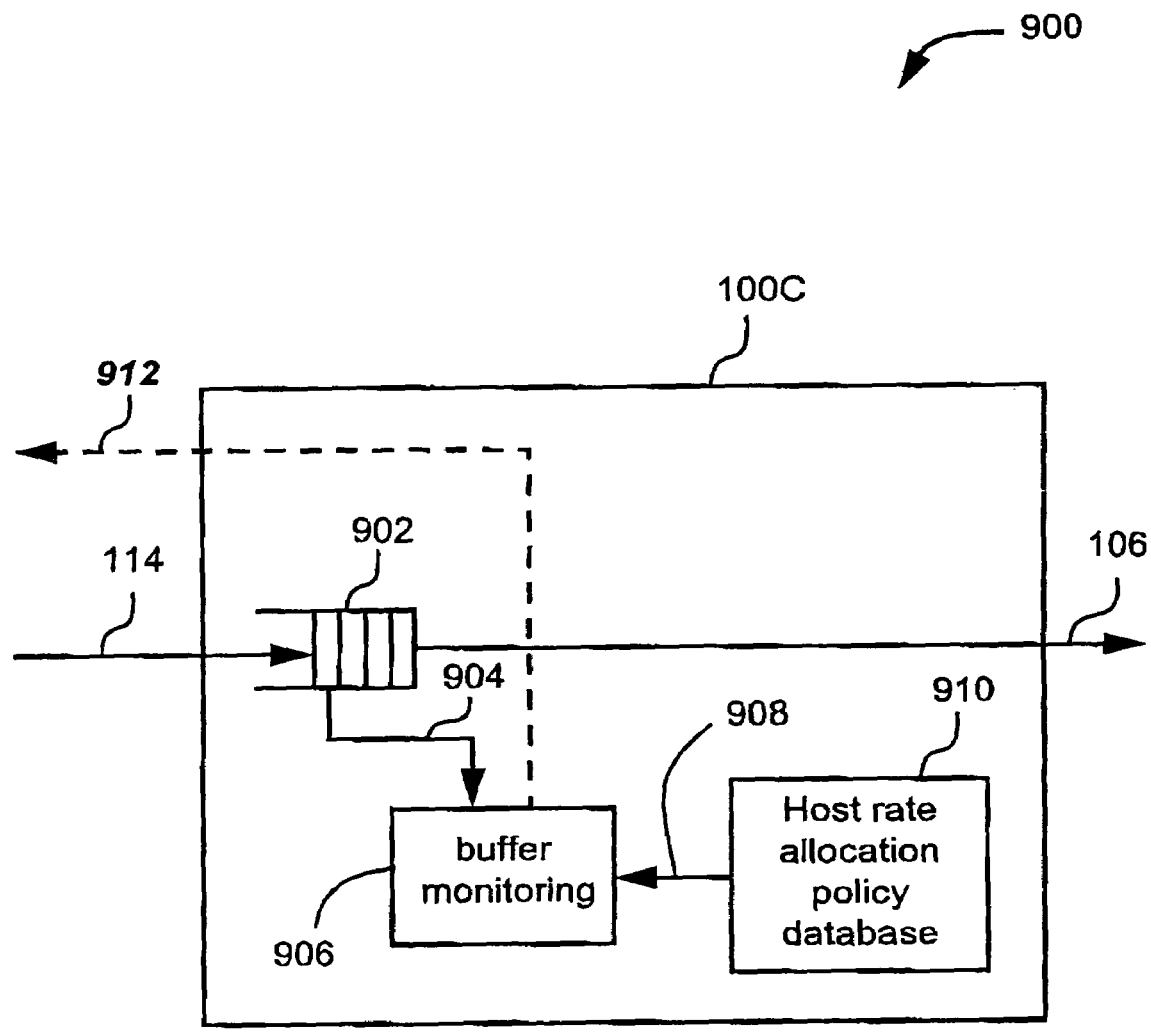
FIG. 7 shows a functional block diagram of a gateway incorporating the disclosed congestion control technique.

FIG. 7 shows a functional block diagram 900 of a gateway 100C in which an advantageous congestion control technique is used. The gateway 100C has a First-In-First-Out (FIFO) buffer 902. A buffer monitoring module 906 measures the state of the buffer 902 as depicted by an arrow 904. The buffer monitoring module 906 also receives information from a host rate allocation policy database 910 as depicted by an arrow 908. The buffer monitoring module 906 emits an explicit rate control feedback signal 912 which is communicated back to the associated host machines as will be described in relation to FIG. 8.

The host "rate allocation policy" (also referred to as "bandwidth allocation policy") database 910 contains a set of rules by which the bandwidth available on the link 106 is allocated to the host machines associated with the gateway 100C. In a simple example, the allocation policy can be to distribute the available bandwidth on the link 106 on an equal basis between the hosts 108, . . . , 116 in the site 102. More advantageously, the database 910 is tailored to provide bandwidth on a per-host basis depending upon the attributes of the particular host. Accordingly, a printer-server host, operating with a relatively low priority, would obtain a minimal amount of bandwidth, while a real-time multimedia video-conferencing host would receive the lions share of the available bandwidth on the link 106.

The gateway 100C receives aggregate traffic from the host machines 108, . . . , 116 in the site 102 on the connection 114. Accordingly, the buffer 902 enables a rate regulation operation to be imposed on the aggregate site traffic delivered from all the host machines in the site 102.

Figure 8:
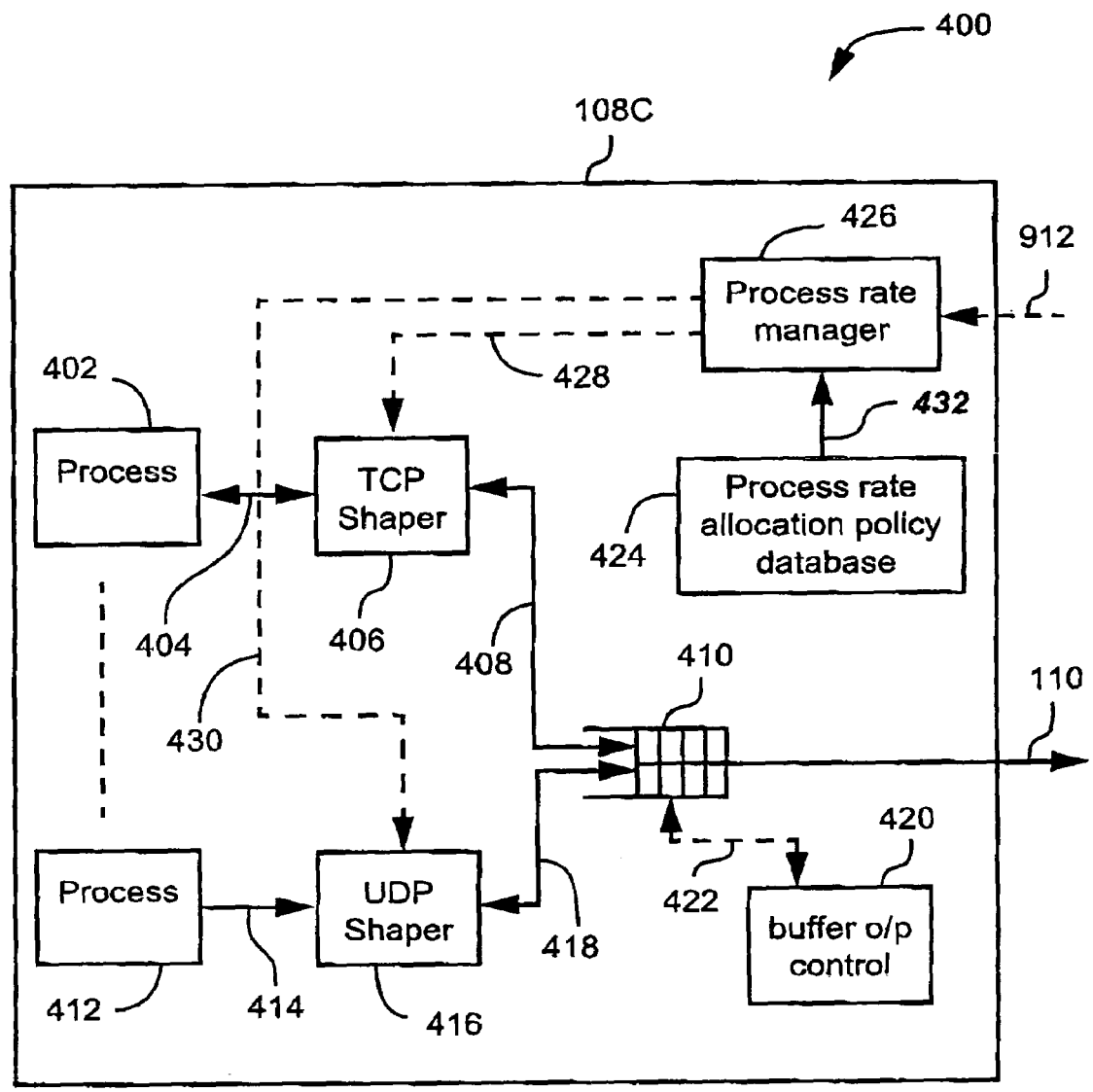
FIG. 8 shows a functional block diagram of a host that is adapted for operation with the gateway of FIG. 7.

FIG. 8 shows a functional block diagram of a host machine 108C that is adapted to work with the gateway 100C of FIG. 7. Processes 402 . . . 412 in the host machine 108C each generate data packets and deliver them to associated, individually assigned, shapers 406 . . . 416. These shaper processes are spawned by the host machine as appropriate in order to provide each process which requires inter-site communications with a shaper as shown in FIG. 8. These shapers 406-416 deliver packets, as depicted by respective arrows 408 . . . 418, to a buffer 410, according to the corresponding shaping rates of the shapers. A buffer output control module 420 monitors the buffer 410, and each time a data packet is transmitted onto the link 110, the buffer output control module 420 processes the next packet in the buffer 410 for transmission.

The explicit rate feedback signal 912 from the gateway 100C in FIG. 7 is provided to a process rate manager 426 in the host machine 108C. A process rate allocation policy database 424 also provides information as depicted by an arrow 432 to the process rate manager 426. The process rate manager 426 operates upon the explicit rate feedback signal 912 in accordance with the policies in the database 424 and provides, as a result thereof, appropriate control signals 428, . . . , 430 to the respective shapers 406 . . . 416 to thereby control the respective shaper attributes on an individual shaper basis.

FIGS. 7 and 8 therefore enable a hierarchical congestion control mechanism to be implemented. The host rate allocation policy database 910 in the gateway 100C firstly allocates bandwidth which is available on the link 106 on a per host basis, after which the process rate allocation policy database 424 in each host machine further allocates the allocated host bandwidth to the various host processes 402, . . . , 412.

The process rate allocation policy database 424 can, for example, adopt a simple approach of allocating equal bandwidth to each of the processes 402, . . . , 412. On the other hand, and more advantageously, bandwidth can be allocated to processes on a priority basis. Accordingly, for example, a file transfer process having a low priority can be accorded a low bandwidth, while a real-time multimedia communications process can be allocated higher bandwidth.

The per-process shapers 406, . . . , 416 can be of various types, as depicted in FIG. 8. Accordingly, the shaper 406 is designated as a TCP shaper which indicates that the shaper 406 does not permit packet loss. In order to avoid packet loss, the shaper 406 acts to throttle back the process 402 when the buffer (not shown) in the shaper 406 becomes full. The connection 404 is depicted by a bilateral arrow which allows both provision of data packets from the process 402 to the shaper 406, and provision of the throttling-back signal from the shaper 406 to the process 402.

In contrast, the shaper 416 is a User Data Protocol (UDP) shaper, which allows packet loss but causes little or minimal packet delay when shaping packet traffic from the process 412. The connection 414 is depicted as a unilateral arrow from the process 412 to the shaper 416 since the shaper 416 does not impose a throttling-back signal to the process 412.

The shapers 406, . . . , 416 distribute packets as depicted by respective arrows 408, . . . , 418 to the buffer 410. This is a FIFO buffer which is controlled by the buffer output control module 420 as depicted by an arrow 422. The control module 420 monitors the state of the buffer 410 and when a data packet is transmitted onto the link 110 the control module 420 processes the next data packet in the buffer 410 for subsequent transmission.

Figure 9:
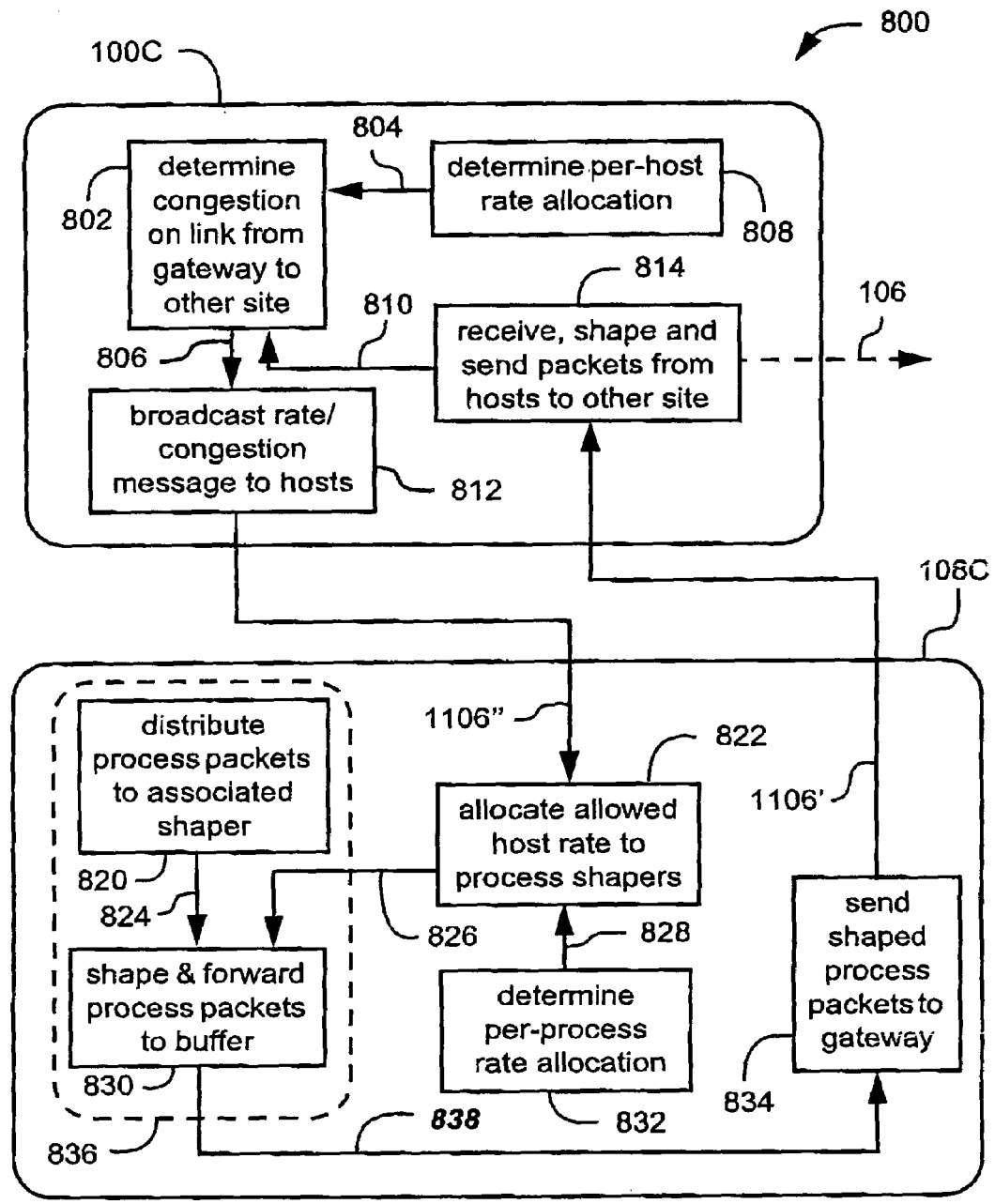
FIG. 9 depicts functional inter-working between the gateway and the host of FIGS. 7 and 8 respectively.

FIG. 9 shows the distribution of functionality, in the form of a process flow diagram, between the gateway 100C and the host machine 108C in the system of FIG. 1. Turning firstly to the host machine 108C a functional block 820 distributes processed packets to an associated shaper. The functional block 820 corresponds to the process 402 in FIG. 8. A subsequent functional block 830 shapes and sends process packets to a buffer. This functional block 830 corresponds to the shaper 406, for example, together with the buffer 410. Thereafter, a functional block 834 sends shaped process packets over a connection 1106' to a functional block 814 in the gateway 100C. The functional block 834 in the host machine 108C is equivalent to the buffer 410 in conjunction with the buffer output control module 420 of FIG. 8.

Turning now to the gateway 100C, the functional block 814 receives the data packets from the plurality of hosts connected to the gateway 100C, and sends them to the second site 104 over the link 106, which is shown in dashed form in FIG. 9. The functional flow in FIG. 9 flows from the block 814, via an arrow 810 to a functional block 802 which determines congestion on the link 106 from the gateway 100C to the other site 104. Congestion is detected by the gateway 100C which monitors the current status of the (gateway) buffer 902. If the occupancy of the buffer 902, or its current queue length, exceeds a predetermined threshold, then the link 106 is considered to be congested.

The functional block 802 operates in conjunction with information provided by a host rate allocation determination functional block 808. The rate allocation block 808 corresponds to the host rate allocation database 910 in conjunction with the buffer monitoring module 906 in FIG. 7. The congestion information derived by the functional block 802 of FIG. 9 is provided, as depicted by an arrow 806 to a functional block 812 that broadcasts rate and congestion messages to the various hosts 108C, . . . , 116C that are connected to the gateway 100C. The aforementioned rate and congestion messages are passed to the host machine 108C as depicted by an arrow 1106".

Back in the host machine 108C a functional block 822 allocates the bandwidth (which itself has been allocated by the gateway 100C) in accordance with information provided by a process rate determination block 832 as depicted by an arrow 828. The block 832 corresponds to the process rate allocation database 424 in FIG. 8, and the functional block 822 corresponds to the process rate manager 426 in FIG. 8. The functional block 822 signals, as depicted by an arrow 826, a shaping and forwarding block 830 thereby establishing the shaping attributes of the corresponding shaper (such as the shaper 406 in FIG. 8).

It is noted that the functional blocks 820 and 830 in the host machine 108C are enveloped in a dashed rectangle 836 in order to indicate that there are typically a number of software processes and associated shapers active on the host machine 108C at any time.

The functional block 802 in the gateway 100C corresponds to functions in the buffer monitor 906 in the gateway 100C. The functional block 808 in the gateway 108C corresponds to the module 910 in FIG. 7. The functional block 812 in FIG. 9 is performed by the module 906 in FIG. 7. The functional block 814 in FIG. 9 corresponds to the module 902 in FIG. 7. The functional block 820 in FIG. 9 is performed by the modules 402, . . . , 412 in FIG. 8. The functional block 830 in FIG. 9 corresponds to the modules 406, . . . , 416 in FIG. 8. The functional block 822 in FIG. 9 corresponds to the module 426 in FIG. 8. The functional block 832 in FIG. 9 corresponds to the module 424 in FIG. 8. The functional block 834 in FIG. 9 corresponds to the modules 410 and 420 in FIG. 8.

Figures 10A, 10B:
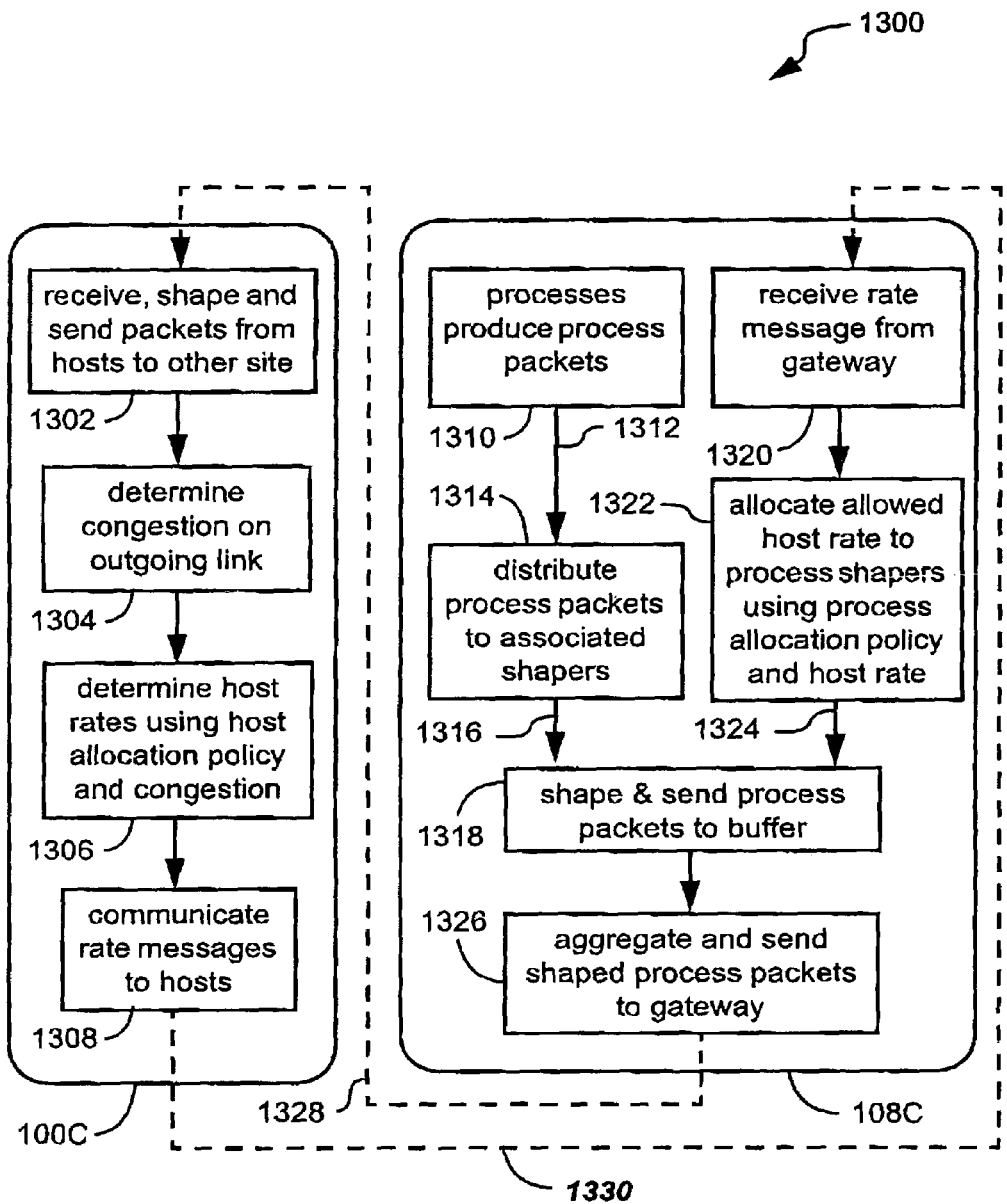
FIGS. 10A and 10B show process flow diagrams for the host and gateway of FIGS. 7 and 8.

FIGS. 10A and 10B depict process flow diagrams for the gateway 100C and the host machine 108C of FIGS. 7 and 8 respectively. Turning to FIG. 10A the process for the gateway 100C commences with a step 1302 in which the buffer 902 of the gateway 100C receives and sends packets received from the host machines 108C . . . 116C to the other site 104 over the link 106. Thereafter, a step 1304 determines, using a signal 904 from the buffer 902 to the buffer monitoring module 906, congestion on the outgoing link 106. In a subsequent step 1306 the buffer monitoring module 906 determines host rates using the host rate allocation policy database 910 and the congestion measure 904 from the buffer 902. In a following step 1308 the buffer monitoring module 906 communicates rate messages as depicted by a dashed arrow 1330 to the hosts 108C . . . 116C.

Turning from the gateway 100C to the host machine 108C, in a first step 1320 the process rate manager 426 receives the rate messages, as depicted by the dashed arrow 1330, from the gateway 100C. Thereafter, in a step 1322 the process rate manager 426 allocates the allowed host rate to the processes 402 . . . 412 (see FIG. 8) by signalling the associated shapers 406 . . . 416 as depicted by dashed arrows 428 . . . 430 in FIG. 8. This allocation also makes use of information depicted by the arrow 432 from the process rate allocation database 424 in FIG. 5.

Returning to FIG. 10B, in a step 1310 the process 402 (see FIG. 8) produces the process data packets, after which, in a step 1314, the process 402 distributes these packets to its associated shaper 406 (see FIG. 8). In a subsequent step 1318 the shaper 406 (see FIG. 8) shapes the received data packets and sends them to the buffer 410 (see FIG. 8). The steps 1310, 1314 and 1318 have been described as they apply to the process 402 and its associated shaper 406, however it will be apparent that the same process steps take place in regard to all the processes 402 . . . 412 and their associated shapers 406 . . . 416.

After the step 1318, a subsequent step 1326 aggregates the received shaped data packets in the buffer 410. The buffer 410 together with the buffer output control module 420 then send the shaped process packets to the gateway over the link 110. The process of FIG. 10B is then directed as depicted by a dashed arrow 1328 back to the step 1302.

Figure 11:
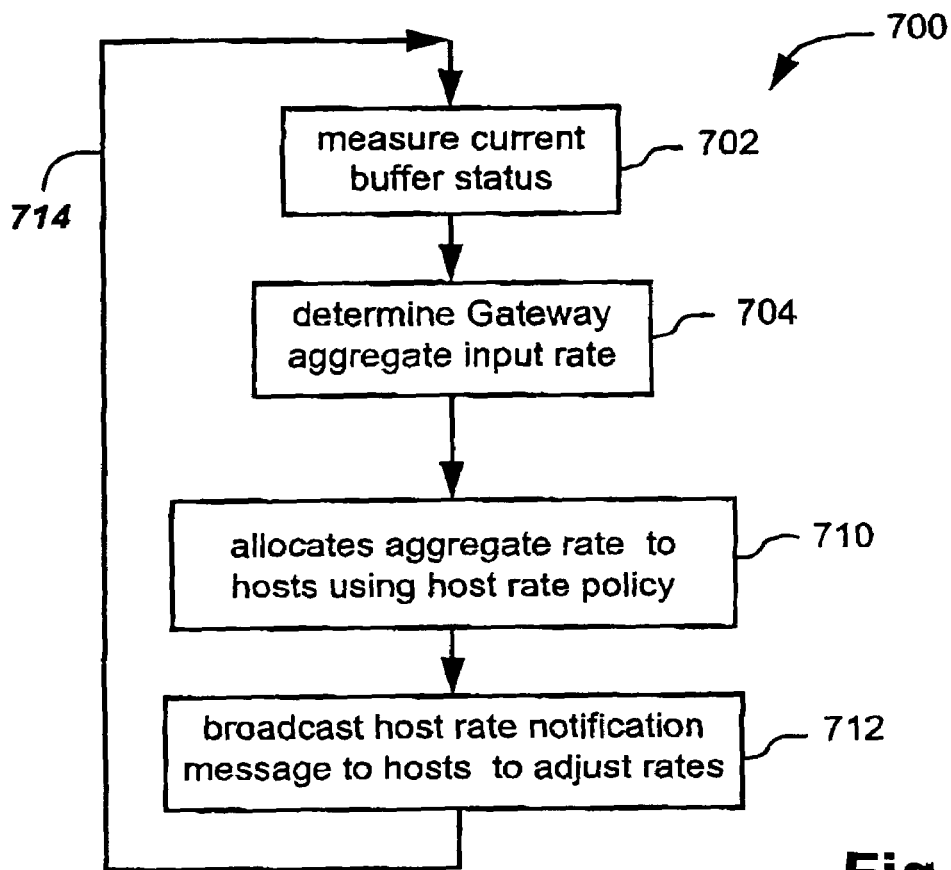
FIG. 11 shows a process flow diagram for the gateway of FIG. 7 relating to allocation of bandwidth on a per-host basis.

FIG. 11 shows a process flow diagram for per-host rate allocation in the gateway 100C. The process commences with a step 702 in which current buffer status of the gateway buffer 902 is measured by the buffer monitoring module 906 in FIG. 7. In a subsequent step 704 the buffer monitoring module 906 determines the allowable aggregate input rat "R" for the gateway 100C in accordance with the foll wing mathematical expression:

$$R = \text{MAX}(0, (C + K(Q-q)))$$

where:

0=zero

C=Line capacity of the link 106 (see FIG. 7)

K=A Gain parameter, this effects the stability of the system

Q=The desired length of the queue in the buffer of the gateway shaper 902 q=Current length of the queue

The current buffer status of the gateway buffer 902 (see FIG. 7) is measured, and "R" is calculated, every "T" seconds.

It has been determined that a value of K=1/T provides good stability performance.

The process is then directed to a step 710 in which the buffer monitoring module 906 allocates the aggregate allowable input rate to the hosts 108C . . . 116C using the host rate allocation policy database 910. Thereafter, a step 712 broadcasts appropriate host rate notification messages containing the allocated rates determined in the step 710 to the hosts 108C . . . 116C telling the hosts to adjust their rates accordingly.

It will be apparent that FIG. 11 relates to allocation of bandwidth, which is available on the link 106, to the hosts 108C . . . 116C based on policies set in the host rate allocation policy database 910. This is the first part of the hierarchical congestion control technique in which the priority of the various host machines determines how much bandwidth in the link 106 is allocated to each host.

Figure 12:
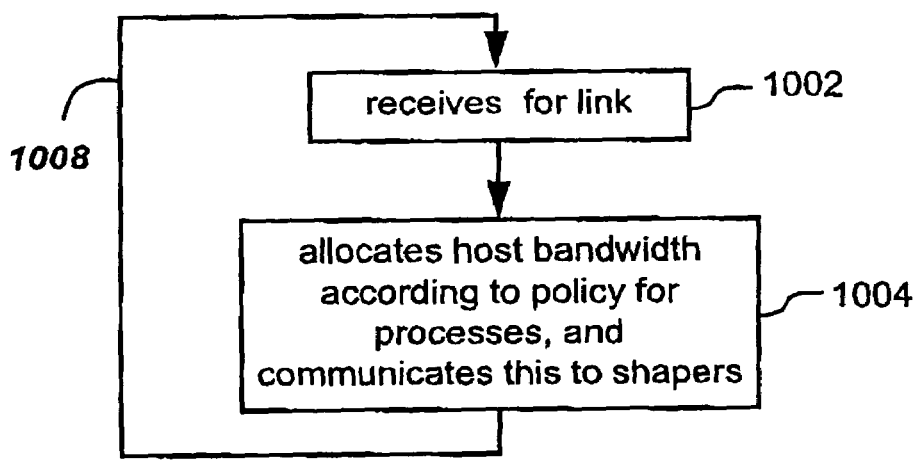
FIG. 12 shows a process flow diagram for the host of FIG. 8 relating to control of the per-process shapers in the host.

FIG. 12 shows a process flow diagram depicting how the host machine 108C controls the packet traffic from each of the processes 402 . . . 412 on the basis of the incoming host rate notification messages depicted by the dashed arrow 912 in FIG. 8. In a first step 1002 the process rate manager 426 receives the host rate notification message for the host machine 108C. In a subsequent step 1004 the process rate manager 426 determines how the rate that has been allocated to the host machine 108C is to be allocated, according to the policy information in the database 424, and distributes this per-process rate allocation information to the shapers 406 . . . 416 as depicted by the dashed arrows 428 . . . 430. Thereafter, the process 1000 is directed as depicted by an arrow 1008 back to the step 1002.

Figure 13:
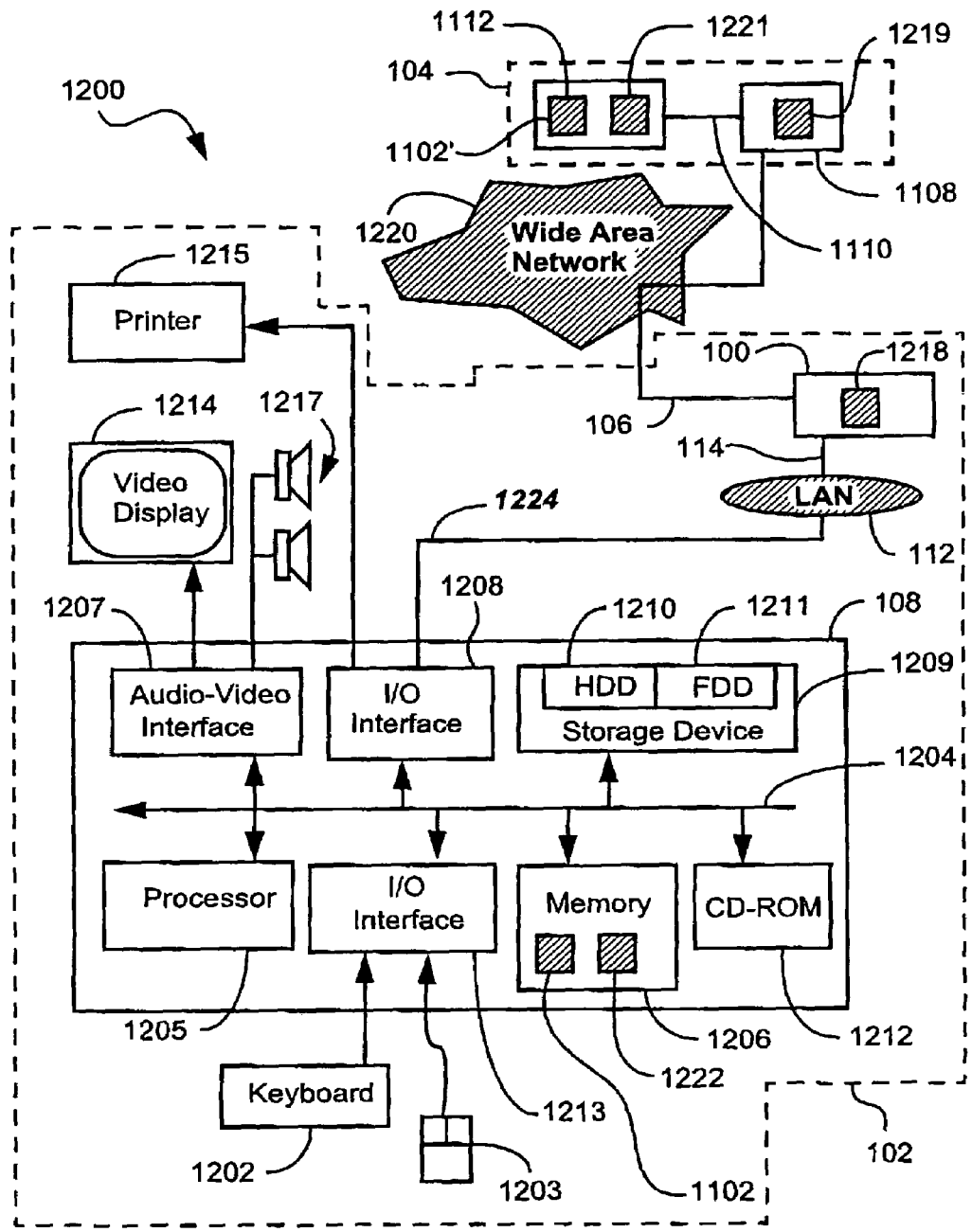
FIG. 13 shows a schematic block diagram of an interconnected computer system upon which the congestion control technique can be practiced.

FIG. 13 shows a schematic block diagram of a interconnected computer system upon which the disclosed congestion control technique can be practiced. The depicted system is merely one example of where the described technique can be applied, and it is not intended that this example be limiting in any way. Depicted in FIG. 13 are the first and second sites 102 and 104 respectively (see FIG. 1) depicted by dashed polygons. The sites 102 and 104 include their respective host machines 108 and 1112 (see FIG. 2) and their respective gateways 100 and 1108.

The host machine 108 in the first site 102 is connected by a direct Ethernet™ connection 1224 from the I/O interface 1208 to the LAN 112. The LAN is in turn connected by the link 114 to the gateway 100. The gateway 100 in the first site 102 is connected by the low speed link 106 via a Wide Area Network (WAN) 1220 to the gateway 1108 in the second site 104. That gateway 1108 is connected by the link 1110 directly to the host machine 1112 without an intervening LAN, in the present example.

The software process 1102 is running on the host machine 108 in the first site 102, and the complementary software process 1102' with which the process 1102 is communicating is running on the host machine 1112 in the second site. The functional host processes 820, 830, 836, 822, 832 and 834 (see FIG. 9) are implemented in software and are depicted by respective shaded rectangles 1222 and 1221 on the respective host machines 108 and 1112. The functional gateway processes 802, 812, 808 and 814 (see FIG. 9) are implemented in software and are depicted by respective shaded rectangles 1218 and 1219 on the respective gateways 100 and 1108.

The various software processes referred to may be formed as one or more code modules, each for performing one or more particular tasks. (The code modules can be organised along functional lines as depicted in FIG. 9). Some or all of the software processes may also be divided into two separate parts, in which a first part performs the congestion control methods, and a second part manages a user interface between the first part and the user. The software may be stored in a computer readable medium, including the storage devices described below, for example. The software processes are loaded into the various computer modules from the computer readable 0medium, and then executed by the computer modules. A computer readable medium having such software or computer program recorded on it is a computer program product. The use of the computer program product in the computer preferably effects an advantageous apparatus for congestion control.

The functionality of the various host machines 108, . . . , 116, 1112 and gateways 100, . . . , 1108 can vary, depending on the particular requirements of each computer module. A typical computer module, however, contains input devices such as a keyboard 1202 and mouse 1203, output devices including a printer 1215, a display device 1214 and loudspeakers 1217. The Ethernet™ connection 1224 is used by the host machine 108 for communicating to and from the LAN 112, and can make use of copper or optical cables, or other functional transmission media.

The connection 1224 can be used to obtain access, via the LAN 112 and the WAN 1220, to the Internet, and other network systems.

The host machine 108 typically includes at least one processor unit 1205, and the memory unit 1206, for example formed from semiconductor random access memory (RAM) and read only memory (ROM). The module 108 also includes an number of input/output (I/O) interfaces including an audio-video interface 1207 that couples to the video display 1214 and the loudspeakers 1217, an I/O interface 1213 for the keyboard 1202 and the mouse 1203 and optionally a joystick (not illustrated), and an interface 1208 for the Ethernet™ connection 1224 and the printer 1215.

A storage device 1209 is provided and typically includes a hard disk drive 1210 and a floppy disk drive 1211. A magnetic tape drive (not illustrated) may also be used. A CD-ROM drive 1212 is typically provided as a non-volatile source of data. The components 1205 to 1213 of the host machine 108, typically communicate via an interconnected bus 1204 and in a manner which results in a conventional mode of operation of the host machine 108 known to those in the relevant art. Examples of computers on which the described arrangements can be practised include IBM-PC's and compatibles, Sun Sparcstations or alike computer systems evolved therefrom.

Typically, the application program 1102 and the other software processes running on the host machine 108 are resident on the hard disk drive 1210 and read and controlled in their execution by the processor 1205. Intermediate storage of the programs and any data fetched from the network 1220 may be accomplished using the semiconductor memory 1206, possibly in concert with the hard disk drive 1210. In some instances, the application program may be supplied to the user encoded on a CD-ROM or floppy disk and read via the corresponding drive 1212 or 1211, or alternatively may be read by the user from the network 1220 via the Ethernet™ connection 1224. Still further, the software can also be loaded into the computer system 108 from other computer readable media. The term "computer readable medium" as used herein refers to any storage or transmission medium that participates in providing instructions and/or data to the computer system 108 for execution and/or processing. Examples of storage media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 108. Examples of transmission media include radio or infra-red transmission charmers as well as a network connection to another computer or networked device, and the Internet or Intranets including e-mail transmissions and information recorded on Websites and the like.

INDUSTRIAL APPLICABILITY

It is apparent from the above that the arrangements described are applicable to the computer and data processing industries.

The foregoing describes only some embodiments of the present invention, and modifications and/or changes can be made thereto without departing from the scope and spirit of the invention, the embodiments being illustrative and not restrictive.

The claims defining the invention are as follows:

1. A system for controlling network congestion, the system comprising:

a plurality of host computers where at least one of the host computers is adapted to run concurrent processes; and a gateway linked to the plurality of host computers, through which communications traffic from the concurrent processes flows to corresponding processes; wherein the gateway is adapted to determine available bandwidth on the connections between the gateway and the corresponding processes, and to communicate host rate control information which is dependent upon said available bandwidth, to each of the plurality of host computers; and at least one of the plurality of host computers is adapted to control a traffic flow between each said concurrent process and said corresponding process according to the host rate control information;

the gateway further includes rules establishing respective priorities of the host computers;

the gateway allocates the determined available bandwidth to the host computers according to the respective priorities of the host computers; and the host rate control information that is sent to each host computer depends upon said allocated available bandwidth and the priority of the host computer.

2. A method for controlling congestion of traffic flows on a network from processes running concurrently on at least one of a plurality of host computers, via a gateway linked to the plurality of host computers, to corresponding processes, the method comprising the steps of:

determining available bandwidth on a connection between the gateway and the corresponding processes;

defining host rate control information as a function of the available bandwidth;

establishing priorities for the concurrent processes based upon rules included in said at least one host computer; and controlling a traffic flow between each said concurrent process and the gateway in accordance with the host rate control information, wherein, said method further comprises the steps of:

establishing, dependent upon host priority rules, respective priorities of the host computers;

allocating, according to the respective priorities of the host computers, the determined available bandwidth to the host computers; and determining the host rate information that is sent to each host computer according to said allocated available bandwidth and the priority of the host computer.

* * * * *